United States Patent [19]

Mueller

[11] Patent Number: 4,727,972
[45] Date of Patent: Mar. 1, 1988

[54] ASBESTOS FREE CLUTCH FACINGS HAVING CROWN GROOVING

[75] Inventor: Ulrich Mueller, Haseluenne, Fed. Rep. of Germany

[73] Assignee: H. K. Porter Co. (Nederland) N.V., Klazienaveen, Netherlands

[21] Appl. No.: 882,096

[22] Filed: Jul. 3, 1986

[30] Foreign Application Priority Data

Jul. 3, 1985 [DE] Fed. Rep. of Germany ....... 3523768

[51] Int. Cl.$^4$ ............... F16D 13/60; F16D 69/00
[52] U.S. Cl. .......................... 192/107 C; 192/107 R
[58] Field of Search ........... 192/107 C, 70.14, 107 R, 192/113 A, 113 B

[56] References Cited

U.S. PATENT DOCUMENTS

| 1,898,978 | 2/1933 | Lane | 192/107 R |
|---|---|---|---|
| 1,936,240 | 11/1933 | Lane | 192/107 R |
| 2,097,710 | 11/1937 | Whitelaw et al. | 192/107 C |
| 2,389,772 | 11/1945 | Gilbert | 192/107 R X |
| 2,448,879 | 9/1948 | Gamble | 192/107 C |
| 2,516,544 | 7/1950 | Breeze | 192/113 B |
| 2,976,975 | 3/1961 | Thostenson et al. | 192/113 A X |
| 4,130,537 | 12/1978 | Bohrer | 260/38 |

FOREIGN PATENT DOCUMENTS

| 1222743 | 8/1966 | Fed. Rep. of Germany . |
|---|---|---|
| 2361127 | 6/1974 | Fed. Rep. of Germany . |
| 319852 | 10/1929 | United Kingdom ............ 192/107 R |
| 412716 | 7/1934 | United Kingdom . |
| 2169673 | 7/1986 | United Kingdom ............ 192/107 R |

Primary Examiner—Rodney H. Bonck
Attorney, Agent, or Firm—Kirkpatrick & Lockhart

[57] ABSTRACT

An asbestos-free clutch plate assembly has a reduced break-in phase and a facing which is substantially uniformly supported by the clutch plate. The assembly comprises a clutch plate defining a first surface and having a plurality of cambered portions. A substantially rigid, wear resistant, asbestos-free facing is attached to the first surface. The clutch facing has a plurality of grooves formed therein with each groove located substantially along the peak of one of the cambered portions thereby reducing the amount of material to be worn away during the break-in phase. The grooves further enable the clutch facing to conform to the contour of the surface so as to be substantially uniformly supported thereby.

11 Claims, 3 Drawing Figures

ASBESTOS FREE CLUTCH FACINGS HAVING CROWN GROOVING

BACKGROUND OF THE INVENTION

Field of the Invention

The invention relates to a driven plate for a motor vehicle clutch with asbestos-free clutch facings.

Asbestos-free clutch facings for such driven plates are described, for example, in German Patent Specification No. 28 04 327.

Asbestos-free clutch facings are very resistant to wear. This requires a relatively long break-in phase for the facing. On account of the specified design of the corresponding driven plate of the clutch, the wear picture which emerges is characterized by so-called load-bearing and non-load bearing points. The arrangement of these points is uniform. As a result of them, the clutch disc is excited during the gear changing process to frictional vibrations. In vehicles in which this factor is critical in the drive line system, such vibrations can lead to an undesirable, even severe roughness during clutch engagement, so-called "chatter" or "judder".

SUMMARY OF THE PRESENT INVENTION

The asbestos-free clutch plate assembly of the present invention has a reduced break in phase because of clutch facings having crown grooves, which facings are substantially uniformly supported by the clutch plate. The assembly comprises a clutch plate defining a first surface having a plurality of cambered portions (cushion). A substantially rigid, wear resistant, asbestos-free clutch facing is attached to the first surface. The clutch facing has a plurality of grooves formed therein with each groove located substantially along the peak of one of the cambered portions (cushions) thereby reducing the surface area and increasing surface pressure, which reduces the break-in phase and increases frictional stability. The grooves further enable the clutch facing to conform to the contour of the surface so as to be substantially uniformly supported thereby.

According to one aspect of the present invention the clutch facing takes the form of an annular disc. The annular disc defines an outside edge and an inside edge. The plurality of grooves extend from the outside edge to the inside edge.

According to another embodiment of the present invention, certain of the plurality of grooves extend over a distance less than the distance between the outside edge and the inside edge thereby increasing the burst strength of the clutch lining. The plurality of grooves extending over a distance less than the distance between the outside edge and the inside edge may begin at the outside edge, the inside edge, may be centered about the midpoint between the outside and inside edges, or some combination thereof.

The present invention reduces the break-in phase and eliminates frictional vibrations (chatter or judder). The object of the invention is to provide an asbestos-free clutch facing in which the above-mentioned roughness during gear changes practically disappears, even in drive systems which are critical from this point of view. The invention which achieves this object is characterized by the fact that, in the contact surfaces of at least one of the annular disc-shaped clutch facings, there are grooves at the points of the maximum spring cushion offset.

BRIEF DESCRIPTION OF THE DRAWINGS

The invention is explained in greater detail below, with reference to one embodiment, which will also serve as the basis for the description of other important features.

DETAILED DESCRIPTION OF A PREFERRED EMBODIMENT

To both sides of a centrally located driven plate (not shown) clutch facings 12 and 14 of asbestos-free material are fastened. Distributed around the circumference of the driven plate, and between the annular disc-shaped clutch facings 12 and 14, there are spring cushion offsets 16, 18, and 20, shown in FIG. 3, formed at intervals from one another in the circumferential direction.

Figure 3:
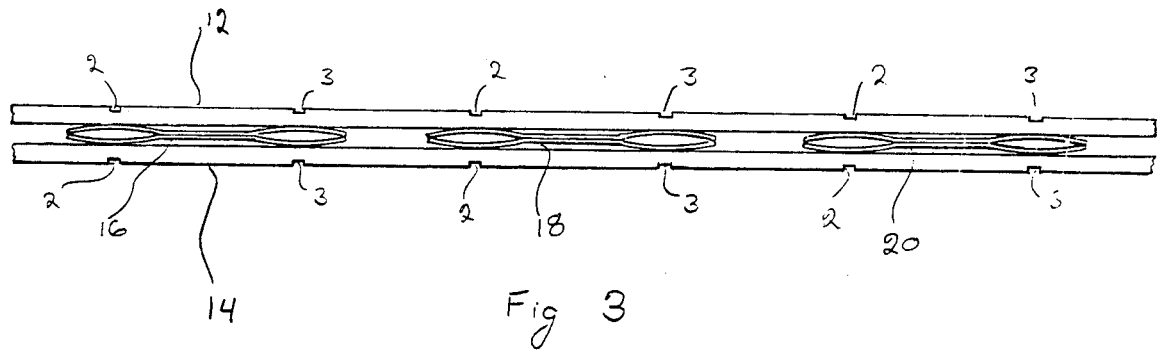
FIG. 3 shows an end view of a clutch assembly taken along the lines III—III in FIG. 1.

The spring cushion offsets are known in the prior art. They are generally formed by fastening metal sheets to a middle plate of the driven plate, with the aforementioned metal sheets laid in pairs on top of one another. The spring cushions extend radially outward from the middle plate. In the vicinity of these wider portions, the sheets are bent out of their plane, as shown in FIG. 3, so that between them, they form spring cushions which provide suspension in the axial direction. These are the above-mentioned spring cushion offsets. They increase the smoothness of gear changes.

The clutch facings 12 and 14 are designed as annular discs in which rivet holes and passages 1 are made in pairs which extend in the axial direction of the ring plate.

Grooves 2, 3, 4, 24, and 26 are located in the path of the maximum spring cushion offset of the corresponding driven plate of the motor vehicle clutch equipped with the asbestos-free clutch facings according to the invention. On account of the grooves, the clutch facing becomes more flexible at the point in question, i.e. those which are initially load-bearing such that the facing can conform to the contours of the driven plate and be substantially uniformly supported thereby. In addition, the material of the clutch facing around the grooves is worn away when loads are applied (gear changes). The width of the grooves therefore need not correspond precisely to the width of the spring cushion offsets. Because the grooves are formed by removing (or pressing inward) material from the points of initial contact, the time needed for break-in is reduced. Therefore the above-mentioned roughness during gear changes need no longer occur.

The grooves 2, 3, 4, 24, and 26 extend essentially continuously according to the path of the spring cushion offsets. They are located—viewed in the axial direction of the driven plate—above the points (line) of maximum spring cushion offset of the corresponding driven plate. Since these spring cushion offsets are generally arranged in pairs, the same is true for the grooves.

The grooves 2 and 3 extend from the inner edge 5 of the clutch facing 12 to the outer edge 6. For reasons of centrifugal strength (burst strength), the grooves can be shortened or interrupted. They then end just ahead of the inside edge 5 and/or outside edge 6 of the clutch facing as shown by grooves 4 and 24, respectively. Here again, the outside edge 6 is preferred to the inside edge 5, to prevent cracking of the clutch facing under increased stress.

According to the invention, there are grooves 2, 3, 4, 24, and 26 in the contact surfaces of the clutch facings. The grooves may be parallel to one another (depending upon the cushions), and can run in the contact surface of the clutch facing from the outside 6 to the inside 5 edge. They are arranged in pairs. The grooves of a groove pair may be at a distance "a" from one another, e.g. 45 mm. They may be be 2.4 mm wide. They may be approximately 1 mm deep. According to the invention, they are located in the path of the maximum spring cushion offset of the corresponding driven plate, which is therefore located directly beneath the clutch facing 12 shown in FIG. 1.

Figure 1:
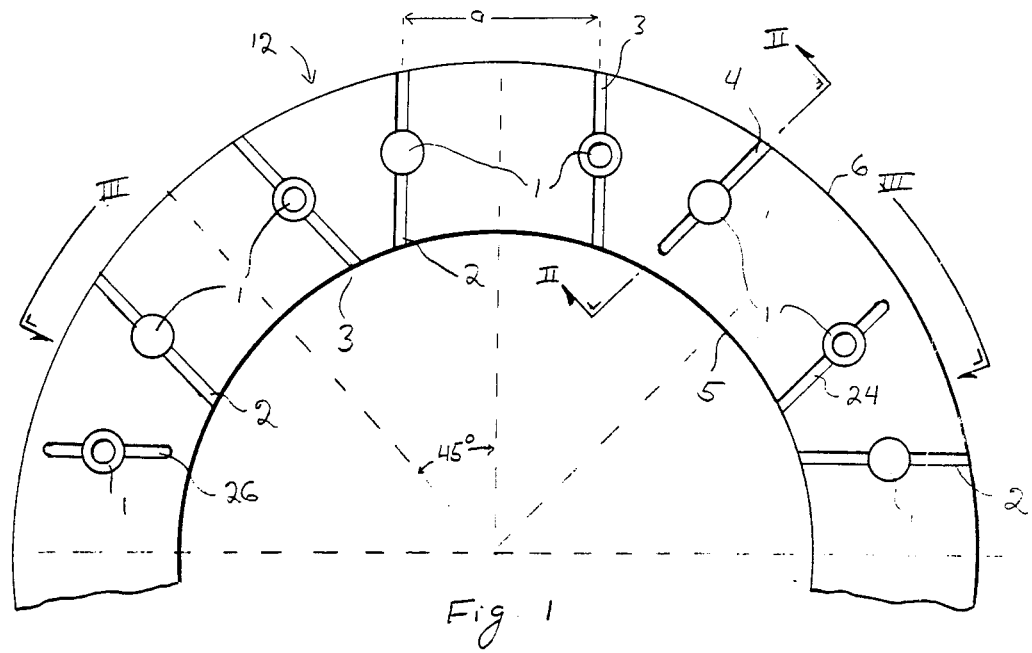
FIG. 1 shows a view of one-half of an asbestos-free clutch facing according to the invention.

FIG. 1 also shows that the grooves 2, 3, 4, 24, and 26 run through one of the holes 1.

With the sample dimensions noted above for grooves 2, 3, 4, 24, and 26 it was assumed that the clutch facing 12 has a thickness of approximately 3.7 mm, as well as a diameter measure to the center of the holes 1 of approximately 180 mm. It should be noted that the holes 1, seen in the radial direction, are approximately in the middle of the clutch facing 12.

Figure 2:
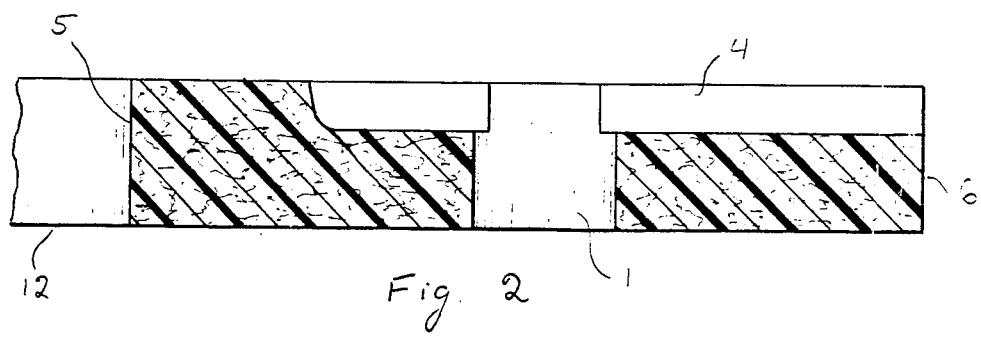
FIG. 2 shows a section along Line II—II in FIG. 1, on an enlarged scale.

FIGS. 1 and 2 show that to increase the centrifugal strength, the groove 4 ends before the inner edge 5 of the clutch plate, i.e. it runs along a radius. The grooves can also end before the outside edge 6, as shown by groove 24, or both edges 5, 6 as shown by groove 26.

The grooves are configured in the contact surfaces of at least one of the clutch facings 12 and preferably in both clutch facings 12 and 14.

What is claimed is:

1. An asbestos-free clutch plate assembly having a reduced break-in phase and wherein the clutch facing is substantially uniformly supported by the clutch plate, said assembly comprising:
   a clutch plate defining a first surface having a plurality of cambered portions, each cambered portion defining a peak; and
   a substantially rigid, wear resistant, asbestos-free clutch facing attached to said first surface, said clutch facing having a plurality of grooves formed therein with each groove located substantially along the peak of one of said cambered portions thereby reducing the break-in-phase, said grooves further enabling said clutch facing to confrom to the contour of said surface so as to be substantially uniformly supported thereby.

2. The clutch plate assembly of claim 1 wherein said clutch facing has the form of an annular disc, said annular disc defining an outside edge and an inside edge.

3. The clutch plate assembly of claim 2 wherein said plurality of grooves extend from said outside edge to said inside edge.

4. The clutch plate assembly of claim 2 wherein certain of said plurality of grooves extend over a distance less than the distance between said outside edge and said inside edge thereby increasing the burst strength of said clutch facing.

5. The clutch plate assembly of claim 4 wherein said certain of said plurality of grooves extending over a distance less than the distance between said outside edge and said inside edge begin at said outside edge.

6. The clutch plate assembly of claim 4 wherein said certain of said plurality of grooves extending over a distance less than the distance between said outside edge and said inside edge begin at said inside edge.

7. The clutch plate assembly of claim 1 wherein said clutch plate defines a second surface having a plurality of cambered portions, each cambered portion defining a peak.

8. The clutch plate assembly of claim 7 wherein said clutch plate includes a plate having radially extending spring cushions cambered in the axial direction to form said plurality of cambered portions in said first and second surfaces.

9. The clutch plate assembly of claim 8 additionally comprising a second, substantially rigid, wear resistant, asbestos-free clutch facing attached to said second surface.

10. The clutch plate assembly o claim 9 wherein said second clutch facing has a plurality of grooves formed therein with each groove located substantially along the peak of one of said plurality of cambered portions thereby reducing the break-in phase, said grooves further enabling said second clutch facing to conform to the contour of said second surface so as to be substantially uniformly supported thereby.

11. An asbestos-free clutch plate assembly having a reduced break-in phase and wherein the clutch facing is substantially uniformly supported by the clutch plate, said assembly comprising:
   a clutch plate defining a first surface having a plurality of cambered portions, each cambered portion defining a peak; and
   a substantially rigid, wear resistant, asbestos-free clutch facing attached to said first surface, said clutch facing having the form of an annular disc defining an outside edge and an inside edge, said clutch facing having a plurality of grooves formed therein with each groove located substantially along the peak of one of said cambered portions thereby reducing the break-in phase, said grooves further enabling said clutch facing to conform to the contour of said surface so as to be substantially uniformly supported thereby,
   and wherein certain of said plurality of grooves extended over a distance less than the distance between said outside edge and said inside edge and being centered about the midpoint between said outside edge and said inside edge thereby increasing the burst strength of said clutch facing.

* * * * *